(12) United States Patent
Palkowsky et al.

(10) Patent No.: US 10,042,864 B2
(45) Date of Patent: Aug. 7, 2018

(54) SYSTEM AND METHOD FOR VISUALIZING THE RELATIONSHIP OF COMPLEX DATA ATTRIBUTES

(71) Applicant: IHS Global Inc., Englewood, CO (US)

(72) Inventors: Betsy Palkowsky, Katy, TX (US); John Steven Reiter, Elizabeth, CO (US); Scott Steigerwald, Aurora, CO (US); Glyn Douglas Phillips, Cardiff (GB); June Sugg, Houston, TX (US)

(73) Assignee: IHS Global Inc., Englewood, CO (US)

( * ) Notice: Subject to any disclaimer, the term of this patent is extended or adjusted under 35 U.S.C. 154(b) by 151 days.

(21) Appl. No.: 15/268,161

(22) Filed: Sep. 16, 2016

(65) Prior Publication Data

US 2017/0024413 A1    Jan. 26, 2017

Related U.S. Application Data

(63) Continuation of application No. 14/066,494, filed on Oct. 29, 2013, now Pat. No. 9,471,602.

(51) Int. Cl.
*G06F 17/30* (2006.01)
*G06T 11/20* (2006.01)
*G06T 11/60* (2006.01)
*G09B 29/00* (2006.01)

(52) U.S. Cl.
CPC .. *G06F 17/30241* (2013.01); *G06F 17/30268* (2013.01); *G06F 17/30277* (2013.01); *G06F 17/30398* (2013.01); *G06F 17/30554* (2013.01); *G06T 11/206* (2013.01); *G06T 11/60* (2013.01); *G09B 29/007* (2013.01)

(58) Field of Classification Search
None
See application file for complete search history.

(56) References Cited

U.S. PATENT DOCUMENTS

| 9,471,602 | B2* | 10/2016 | Palkowsky | G06T 11/206 |
| 2012/0294539 | A1* | 11/2012 | Lim | G06K 9/00664 382/218 |
| 2013/0155181 | A1* | 6/2013 | Williams | G09B 29/106 348/36 |
| 2013/0332078 | A1* | 12/2013 | Shin | G06T 17/05 701/533 |
| 2018/0046725 | A1* | 2/2018 | Lavine | G06F 3/0482 |

* cited by examiner

*Primary Examiner* — James A Thompson
(74) *Attorney, Agent, or Firm* — Faegre Baker Daniels LLP

(57) ABSTRACT

A mapping module is configured to create a preview layer that depicts attributes of real-world objects located within the boundaries of a map. The mapping module uses search criteria to highlight multiple attributes without separately creating a filtered data set for each attribute. The mapping module may change the boundaries of the map in response to changed search criteria. The mapping module may also change the displayed attributes in response to changed map boundaries. By highlighting the selected attributes, the mapping module helps to visually identify relationships between complex real-world objects.

19 Claims, 18 Drawing Sheets

SYSTEM AND METHOD FOR VISUALIZING THE RELATIONSHIP OF COMPLEX DATA ATTRIBUTES

RELATED APPLICATIONS

This application claims the benefit of U.S. Non-Provisional patent application Ser. No. 14/066,494, filed on Oct. 29, 2013. The contents of that application are incorporated herein by reference in their entireties for all purposes.

TECHNICAL FIELD

Embodiments of the present invention generally relate to systems and methods for effectively depicting relationships between complex objects in the real world. More specifically, embodiments of the present invention relate to map-based techniques for visually conveying relationships between attributes of real-world objects.

BACKGROUND

In today's data driven world, large databases are often employed to store vast amounts of information about objects in the real world. A challenge is to effectively identify relationships between those real-world objects using attributes of those objects. Search engines can isolate attributes by filtering out extraneous data based on search criteria. But in order to compare attributes or objects, separate filtering operations must first be performed to isolate those attributes or objects. In addition to adding processing efforts, those filtering processes remove information regarding other attributes and/or objects that could shed additional light on the relationships between objects and/or their attributes. For example, map-based systems, such as a geographic information system or GIS, use filters to visually present attributes for real-world objects. But in order to compare distinct attributes, those systems first create separate filtered data sets for each attribute and then compare those sets to each other.

SUMMARY

Embodiments of the present invention utilize a mapping module configured to access a database in which attribute information for real-world objects is stored in multi-dimensional arrays of data. Each multi-dimensional array of data for an object includes a geo-positional attribute as well as a plurality of other attributes and corresponding values for those attributes. Generally speaking, an attribute refers to a category of information relating to a particular object. Values for attributes identify specific characteristics pertinent to that attribute or category of information. For example, in some embodiments described below in more detail, the objects are wells. An attribute for those wells is "Hole Direction," referring to a category of information (i.e., directions in which the well hole is established) relating to wells. Values for that attribute (i.e., specific characteristics pertinent to that attribute) include "horizontal", "horizontal sidetrack," "intent, deviated," "sidetracked" "unintent, deviated," and "vertical," which describe directions in which a well hole can be established. The mapping module accesses the multi-dimensional arrays of data to determine which objects are located within a set of map boundaries. The mapping module then depicts a default attribute for those objects as part of a preview layer. The preview layer identifies real world objects as well as attributes and values for those attributes. The mapping module enables the user to select one or more of the attributes and/or values and creates distinguishing indicia for the selected attributes and/or values as part of the preview layer. By highlighting various objects, attributes, and/or attribute values within a preview layer, as well as various combinations of objects, attributes, and/or attribute values within a preview layer, a user can visually identify relationships and insight into the data that would not be possible by simply filtering for the selected attributes.

Furthermore, if the user adjusts the map boundaries, for example, by zooming in on the map, the mapping module automatically adjusts the preview layer to display the attributes of the objects within the new view. In addition, if the user includes a query that identifies certain attributes, the mapping module automatically adjusts the preview layer to uniquely highlight those attributes among the other attributes. In some embodiments, adjusting the preview layer includes changing the map boundaries to focus on object exhibiting the selected attributes. In this manner, the mapping module enables dynamic updates to the map view and to the highlighted objects, attributes, and attribute values.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
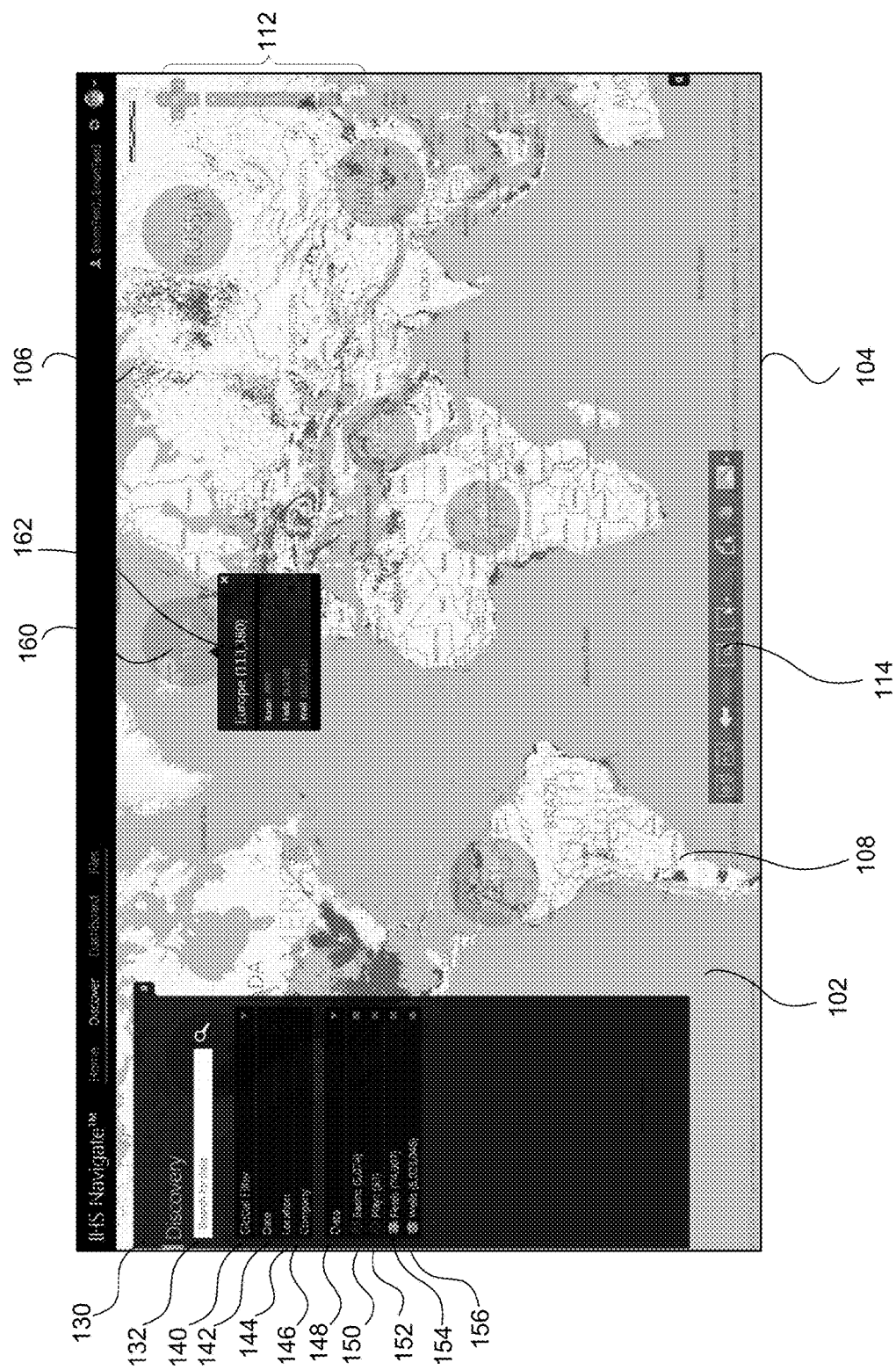
FIG. 1 illustrates a map generated by a mapping module according to embodiments of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

According to some embodiments of the present invention, a mapping module is used to dynamically depict complex data relationships among real-world objects. Specifically, the mapping module accesses a database in which information regarding various attributes of real-world objects is stored, including geo-positional attributes for the real-world objects. The mapping module determines which objects are located within a current map view and generates a preview layer representing attributes for those objects as well as values for those attributes. The mapping module updates the preview layer in response to a user query by highlighting attributes or attribute values selected by the user in the query without first filtering the attribute information. Updating the preview layer may include adding indicia (e.g., multiple colored circles) for objects exhibiting the selected attribute and/or changing the map boundaries to focus on objects exhibiting the selected attribute or attribute value. In this manner, the mapping module visually conveys complex relationships between real-world objects without first filtering out attributes or similar information.

In some of the examples described below, the real-world objects are oil wells and related objects. However, those real-world objects and their attributes are provided only as an example and are not intended to limit the scope of the invention. Embodiments of the invention may relate to any real-world objects (e.g., buildings, natural landscapes, populations, transportation systems, weather patterns, etc.) and any attributes associated with those real-world objects. As described below in more detail, the mapping module may utilize, control, or operate with any number of computing devices, including processors and tangible, non-transitory recording media, in order to perform the functions described herein.

Figure 2:
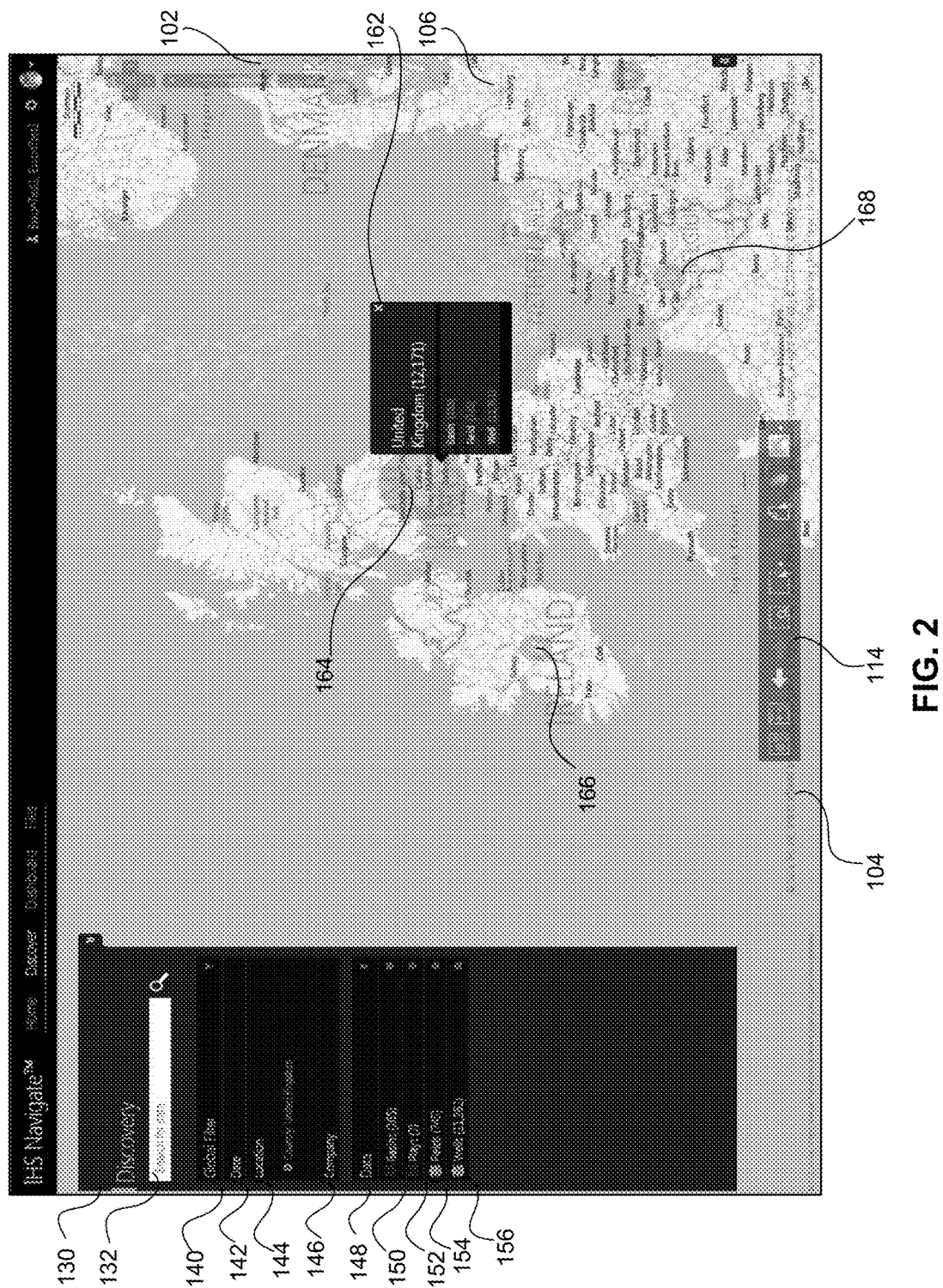
FIG. 2 illustrates the map of FIG. 1 where the mapping module has altered the map using location attributes.
Figure 3:
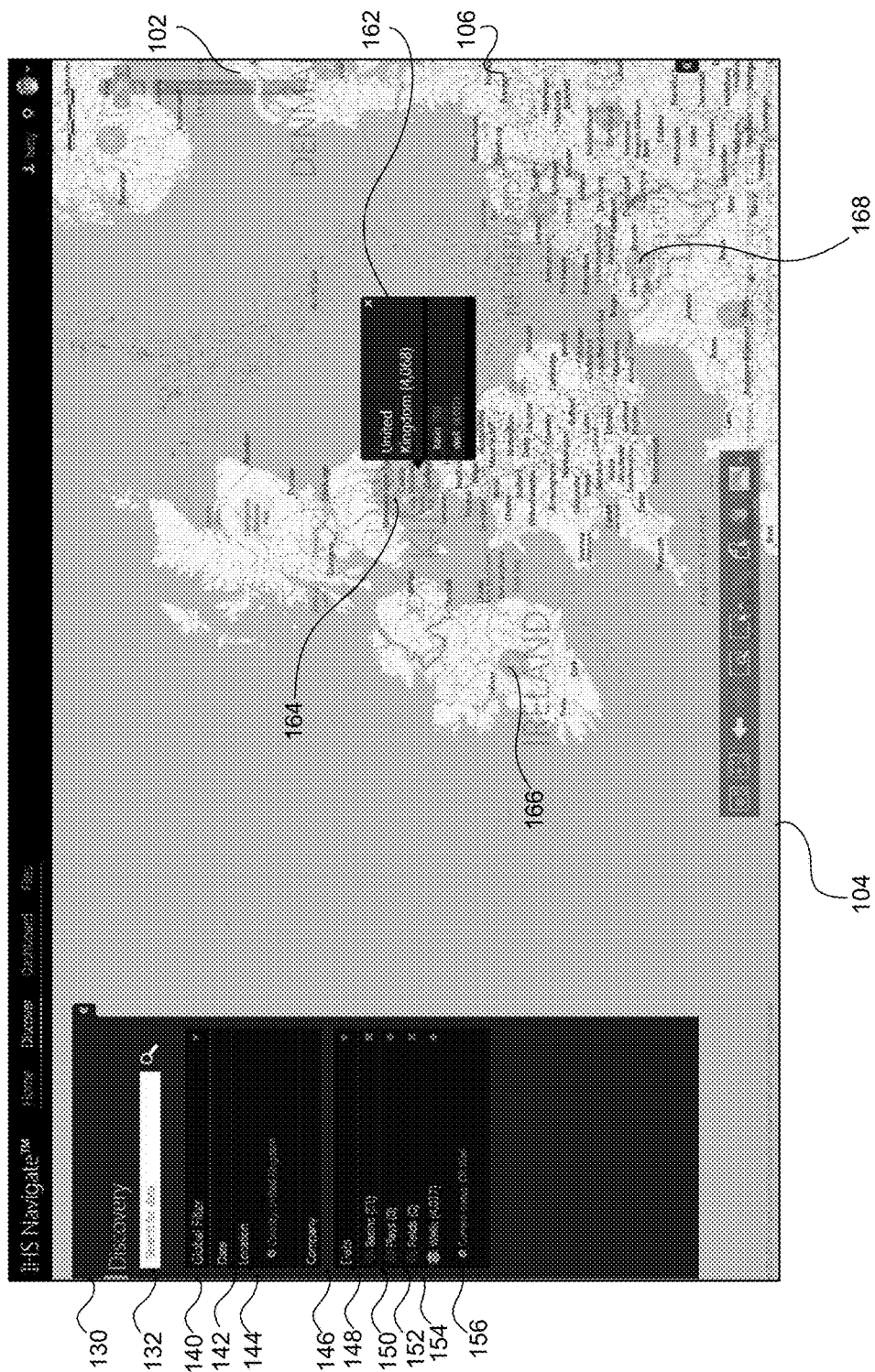
FIG. 3 illustrates the map of FIG. 2 where the mapping module has further altered the map using additional attribute criteria.

In the embodiments shown in FIGS. 1-3, the mapping module generates a map 102. The map 102 includes a base map 104 over which a preview layer 106 is laid. In this embodiment, the preview layer 106 includes indicia for all of the real-world objects within the map view. For example, circle 108 is used to depict a particular oil-well in Argentina. As discussed below in more detail, the preview layer may include additional indicia used to highlight certain attributes of some or all of the real-world objects. The map 102 also includes navigational controls 112 and 114, which can be used to change the regions displayed on the map (e.g., by zooming in or out, selecting a particular area, panning, etc.). As discussed below in more detail, any change in the displayed map regions (e.g., resulting from a zoom-in command) will cause the mapping module to automatically adjust the preview layer to include only those objects within the newly displayed region.

As also shown in FIG. 1, the mapping module generates and displays a discovery panel 130, also referred to as an entity and attribute selection panel. In some embodiments, this panel 130 enables the user to input attribute-based searches that the mapping module then uses to alter the preview layer and/or map boundaries. In some embodiments, the discovery panel 130 also displays listings of objects, attributes, their values, and/or counts of the number of objects, attributes, and/or values for those attributes and objects within a given preview layer 106. These listings and counts may be automatically updated in real time in response to user-input commands to select a particular attribute or attribute value or to change the map boundaries.

For example, in FIG. 1 the discovery panel 130 includes a search bar 132, a global filter bar 140, a date selection bar 142, a location selection bar 144, a company selection bar 146, and a data identifier bar 148. The search bar 132 allows a user to manually input a particular attribute to highlight in the preview layer 106. The global filter bar 140 allows a user to manually select a particular attribute or attribute value, which the mapping module will subsequently filter from the preview layer. The date selection bar 142 enables the user to select a particular date, which the mapping module then uses to highlight objects established before, on, or after that date. Similarly, the location selection bar 144 and company selection bar 146 enables a user to select a particular country or company, which the mapping module then uses to highlight objects within (or without) that country or company. In some embodiment, the mapping module provides a list of values for each of the attributes identified in bars 140-146. For example, if the user selected the location selection bar 144, the mapping module provides a list of values (e.g., specific regions, states, countries, etc.) for that attribute from which the user may select a particular value. As discussed below in more detail, the list of values may be populated based on values within a particular map view, and selecting a particular value causes the mapping module to highlight objects with that attribute value. In some embodiments, selecting an attribute (e.g., country) may cause the mapping module to provide a list of sub-attributes (sub-categories of information such as "countries") which can be selected to display a list of values (e.g., United Kingdom) for the sub-attribute (countries) for the attribute (location).

The user input provided through the discovery panel 130 is used by the mapping module to alter how information in the preview is presented. While the mapping module may use user input as part of a filtering function, the mapping module is able to create a preview layer that highlights a variety of objects, attributes, and/or attribute values within a single layer without using filters to remove information. Thus, relationship information between real-world objects (e.g., ownership, nationality, age, etc.) can be shown without applying filters to the overall data set and thus without removing attribute information.

Still referring to FIG. 1, selecting the data identifier bar 148 causes data sub-bars (in FIG. 1, sub-bars 150-156) to appear, with each sub-bar associated with a particular attribute and attribute values that have been selected to reflect the attributes and attribute values exhibited by objects within the current map extent, as well as any filters that have been applied. For example, and as shown in FIG. 1, the data sub-bar 150 displays the number of basins currently displayed, while data sub-bars 152-156 display the number of play areas, fields, and wells currently identified in the map 102, respectively. Selecting a data sub-bar (e.g., sub-bar 156) will cause the mapping module to display a list of values for the attribute displayed in that sub-bar (e.g., "wells"). In this manner, the discovery panel 130 uses a tiered approach that guides a user to particular attributes and their respective values.

As also shown in FIG. 1, the mapping module generates and displays bubbles, such as bubble 160, used to identify how many objects are associated with selected attribute(s) or value(s). For example, in FIG. 2, the "location" attribute is selected, causing the mapping module to generate bubble 164 that includes the number of objects within the United Kingdom. In some embodiments, the mapping module creates bubbles for particular regions, counties, states, providences, countries, etc. In those embodiments, the mapping module places each bubble at the centroid of the visible area for the associated location. For example, if the entire state of South Dakota were visible in a particular map view, the mapping module would place the bubble at the centroid of that state. If only part of the state were visible, the mapping module would place the bubble at the centroid of the visible area. Thus, the content of the bubbles, as well as their locations, may change due to changes in map boundaries, selected filters, selected attributes, and/or selected attribute values.

The mapping module may also generate and display a pop-up box 162 containing additional attribute information. For example, in FIG. 2, pop-up box 162 identifies the number of basins, plays, fields, and wells within the United Kingdom, as well as the total number of real-world objects in Europe. The pop-up box 162 appears when the user selects a bubble. Many of the operations of the mapping module, such as updating the preview layer 106, the discovery panel 130, the bubbles and/or the pop-up boxes occur in real-time in response to user input and/or selection.

In some embodiments, the mapping module provides an action menu through which users can obtain and/or export additional information regarding a particular attribute or attribute value. For example, in some embodiments the action menu includes an export button that instructs the mapping module to export information regarding a selected attribute or value in any one of a variety of formats (e.g., excel, comma delimited file, spatial layer, etc.). In some embodiments, the action menu includes report button that instructs the mapping module to display more detailed information regarding the selected attribute or attribute value as well as objects exhibiting the selected attribute of attribute value.

As noted above, selecting a particular attribute or value (e.g., using the discovery panel 130) may cause the mapping module to alter the map boundaries to highlight or focus on those objects associated with the attribute or value. As an illustration, the map 102 shown in FIG. 1 displays a preview layer 106 in which the locations of oil-related objects around the globe are highlighted. No filters have been applied to the data set used to create the preview layer 106. If the user selects the location bar 144 and then the attribute value of "United Kingdom," the mapping module automatically zooms in the map 102 to focus on the United Kingdom, as shown in FIG. 2. The mapping module automatically generates or updates the preview layer 106, as well as the discovery panel 130 and the indicia provided thereon, to identify the objects (and the attributes of those objects) within the new map boundaries. In some embodiments, changing the map view and updating the preview layer and discovery panel occurs simultaneously.

Still referring to FIG. 2, bubble 164 and the pop-up box 162 display information regarding objects within the United Kingdom and their attributes. Additional bubbles, such as bubbles 166 and 168, convey information regarding objects in nearby regions. If the user selects the "wells" data sub-bar 156, the mapping module changes the preview layer 106, as well as the bubbles 164, 166, and 168, and the pop-up box 162, to highlight that attribute, as shown in FIG. 3. In some embodiments, these steps are performed dynamically, in real-time, and without applying filters. Thus, as the user builds up the search criteria regarding specific objects and attributes (e.g., oil wells in the United Kingdom), the mapping module automatically updates the preview layer 106.

Figure 4:
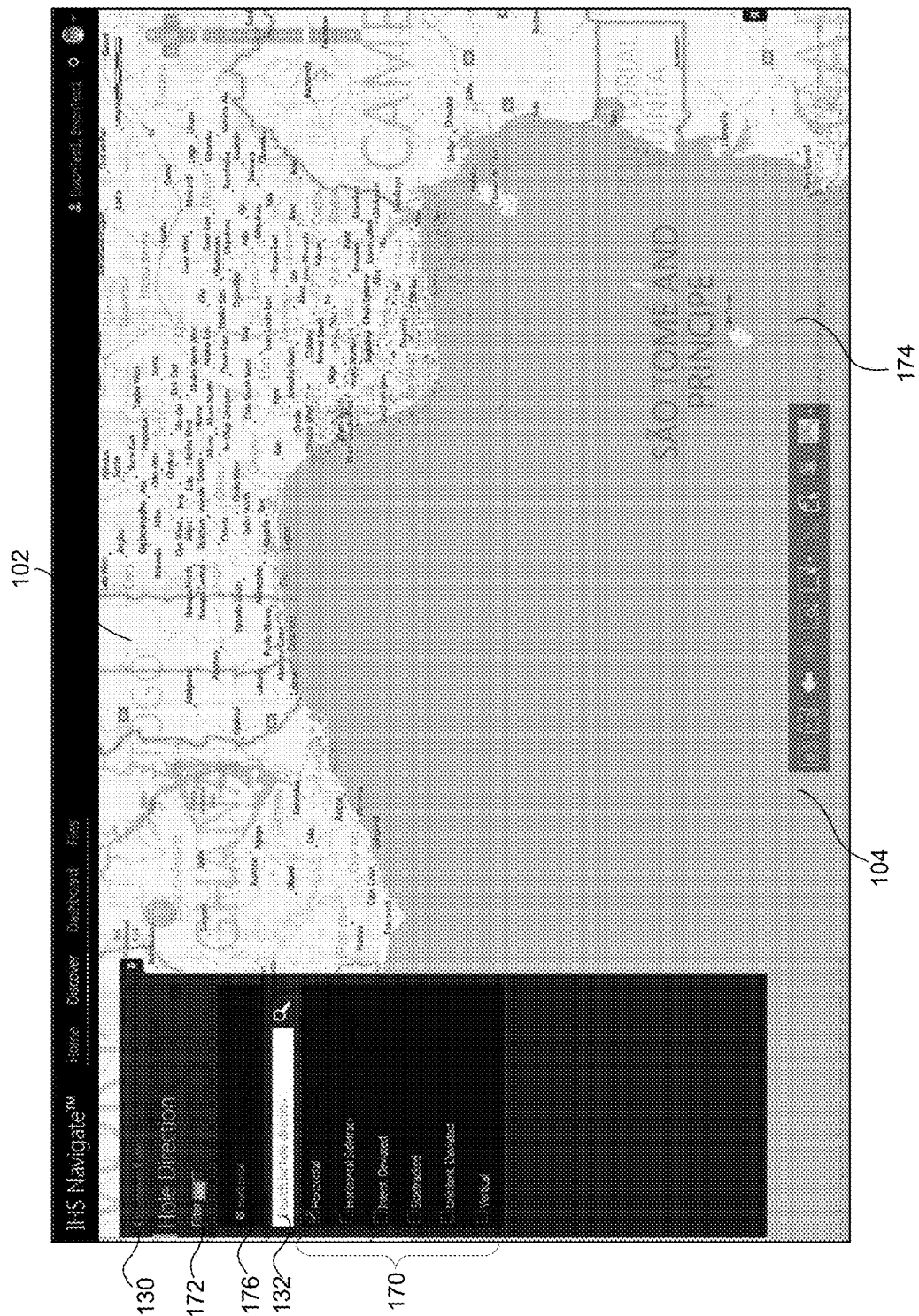
FIG. 4 illustrates a map generated by a mapping module that depicts attribute information in conjunction with a filter button, according to embodiments of the present invention.

In some embodiments, the display panel 130 is used to provide more detailed attribute information for the objects on the map 102, such as a list of the values for a particular attribute. For example, as shown in FIG. 4, the discovery panel 130 displays values 170 for the "hole direction" attribute for those wells within the map boundaries. In some embodiments, this display is accessed by selecting the "wells" data sub-bar (156 in FIG. 1) and then on the "Hole Direction" indicia provided on a subsequent menu. Each of the attributes may be individually or jointly selected as input for the mapping module, as discussed below in more detail. Because the discovery panel 130 displays attribute information for the objects on the map 102, changing the map boundaries (e.g., using a zoom bar) will affect which attributes and/or values are displayed for selection. For example, if the map 102 included no "vertical" wells, then the panel 130 would not display that attribute value for selection.

Figure 5:
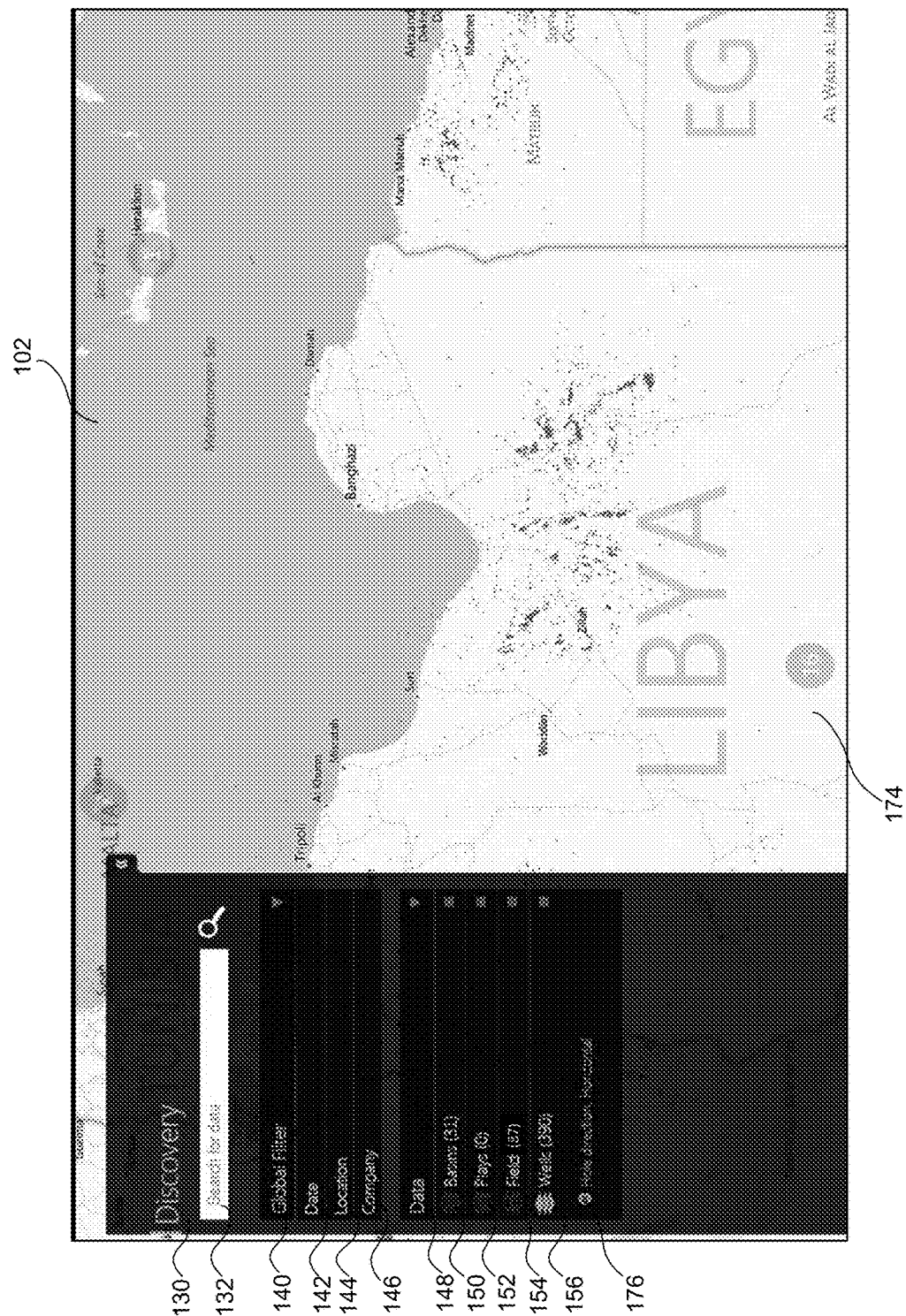
FIG. 5 illustrates the map of FIG. 4 where the map boundaries have been changed.

As also shown in FIG. 4, the panel 130 includes a "filter" button 172. Selecting the filter button 172 turns on a filtering function of the mapping module. In this mode, the mapping module will use the criteria selected through the panel 130 to filter out attributes and/or values and thereby reduce the resulting data set. Thus, rather than a preview layer 106, the mapping module creates a filtered layer 174. For example, in FIG. 4, the filter button 172 has been selected and thus only "horizontal" wells are identified in the filtered layer 174. If the user changes the map boundary (e.g., using a zoom bar), the mapping module will update the filtered layer 174 using those same criteria on the new data set defined by the new map boundaries. For example, FIG. 5 illustrates the map 102 generated using the criteria of FIG. 4 when the map boundaries are changed. As also shown in FIG. 5, the information displayed on the panel 130 (e.g., the "wells" count in data sub-bar 156) reflects the filtered data set. The panel 130 also depicts the filters currently in effect using a filter notification 176. The filtered layer 174 in some embodiments is created by modifying a preview layer.

Figure 6:
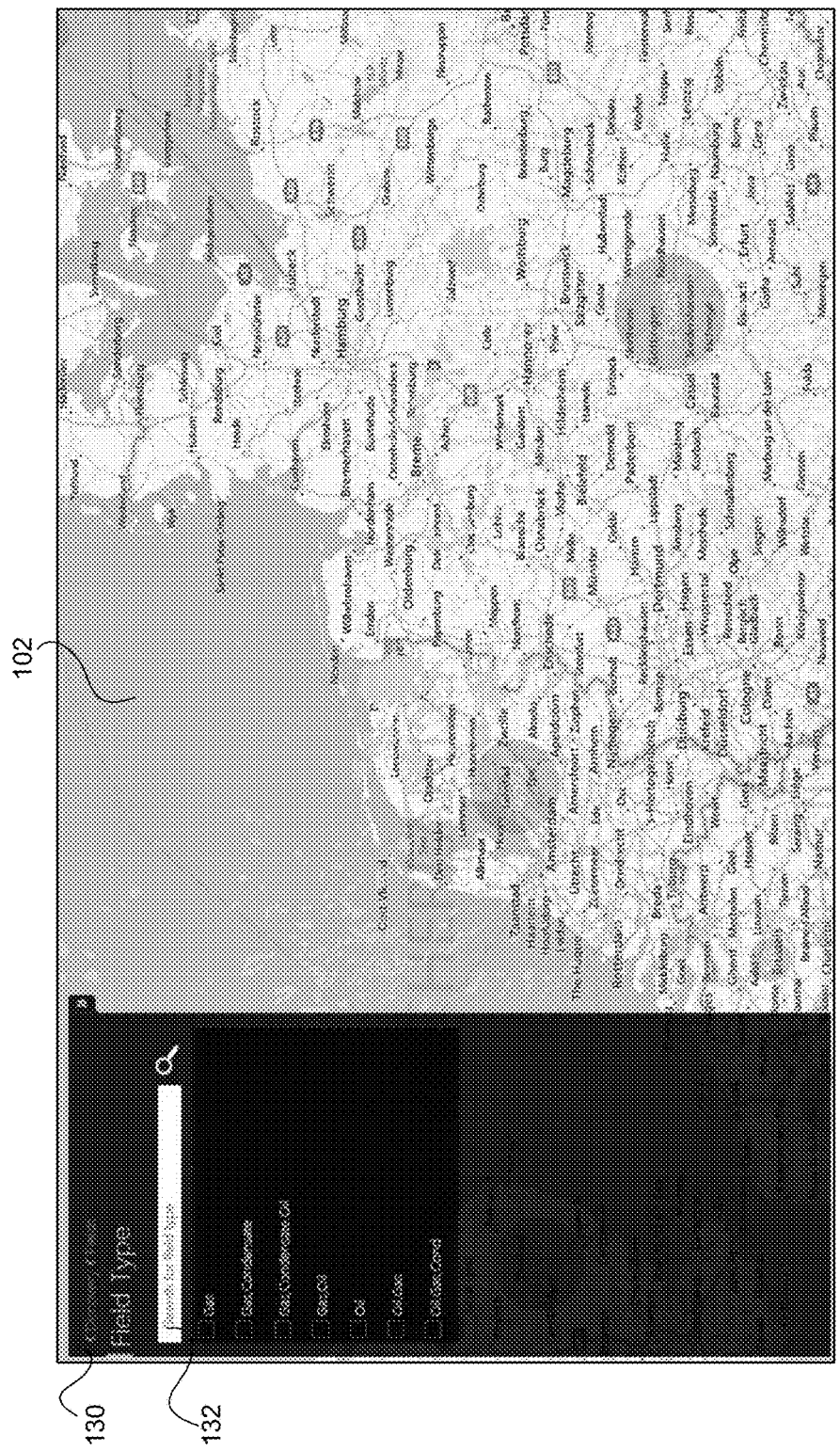
FIG. 6 illustrates a map generated by a mapping module that depicts attribute values for an attribute for displayed objects, according to embodiments of the present invention.

Referring now to FIG. 6, in some embodiments the attributes and values presented in the discovery panel 130 are those attributes and values for the objects within the current map view. Thus, in FIG. 6, all of the "fields" (i.e., the real-world objects) on that map view have one of the seven values listed on the panel 130 for the "Field Type" attribute. Changing the map view causes the mapping module to modify the contents of the panel 130 to reflect the attributes and values of those objects within the new map view.

As discussed above, in some embodiments the mapping module is used to create a preview layer that enables a user to determine relationships between complex real-world objects and their attributes without first creating filtered data sets. In other words, the preview layer created by the mapping module presents combinations of attributes and attribute values for a set of real-world objects without filtering or removing attribute information regarding the real-world objects. Preview layers may be created for any attribute for any type of real-world objects.

Figure 7:
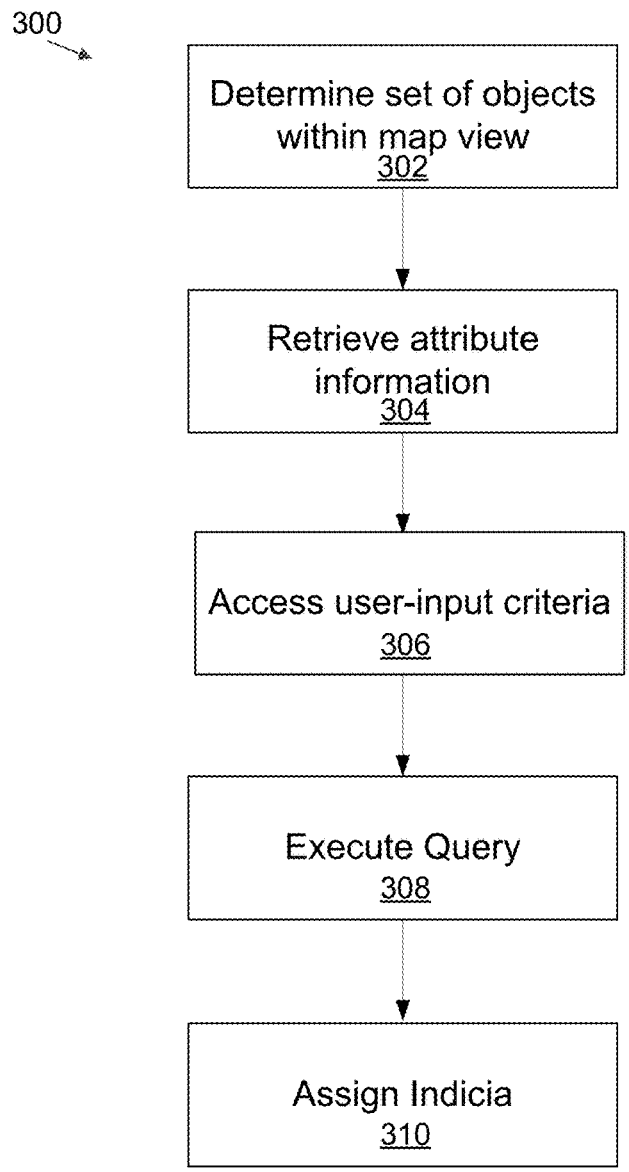
FIG. 7 illustrates a flow chart depicting steps for generating indicia within a preview layer, according to embodiments of the present invention.

In some embodiments, the mapping module highlights attributes using visual indicia in the preview layer. For example, the mapping module may distinguish objects having a particular attribute from other objects lacking that attribute using colored circles or other indicia. An exemplary process 300 for highlighting those objects is shown in FIG. 7. First, the mapping module determines which real-world objects are within a map view, as shown in block 302. The mapping module then retrieves, from a database, attribute information for those real-world objects, as shown in block 304. As discussed below in more detail, each of those operations may include accessing multi-dimensional arrays of information in the database, with the geo-positional information and attribute information for each entity stored in a separate multi-dimensional array. The mapping module then accesses user-input criteria from the discovery panel (130 in FIG. 1) that identifies particular objects and/or attributes, as shown in block 306. The mapping module then executes a query to identify those objects that meet the user-input criteria, as shown in block 308. As shown in block 310, the mapping module assigns a visual identifier to those identified objects within the preview layer. Because the mapping module has not filtered out any attributes or objects from the preview layer, the assigned visual identifier will be different from indicia used to represent the remaining objects.

Figure 8:
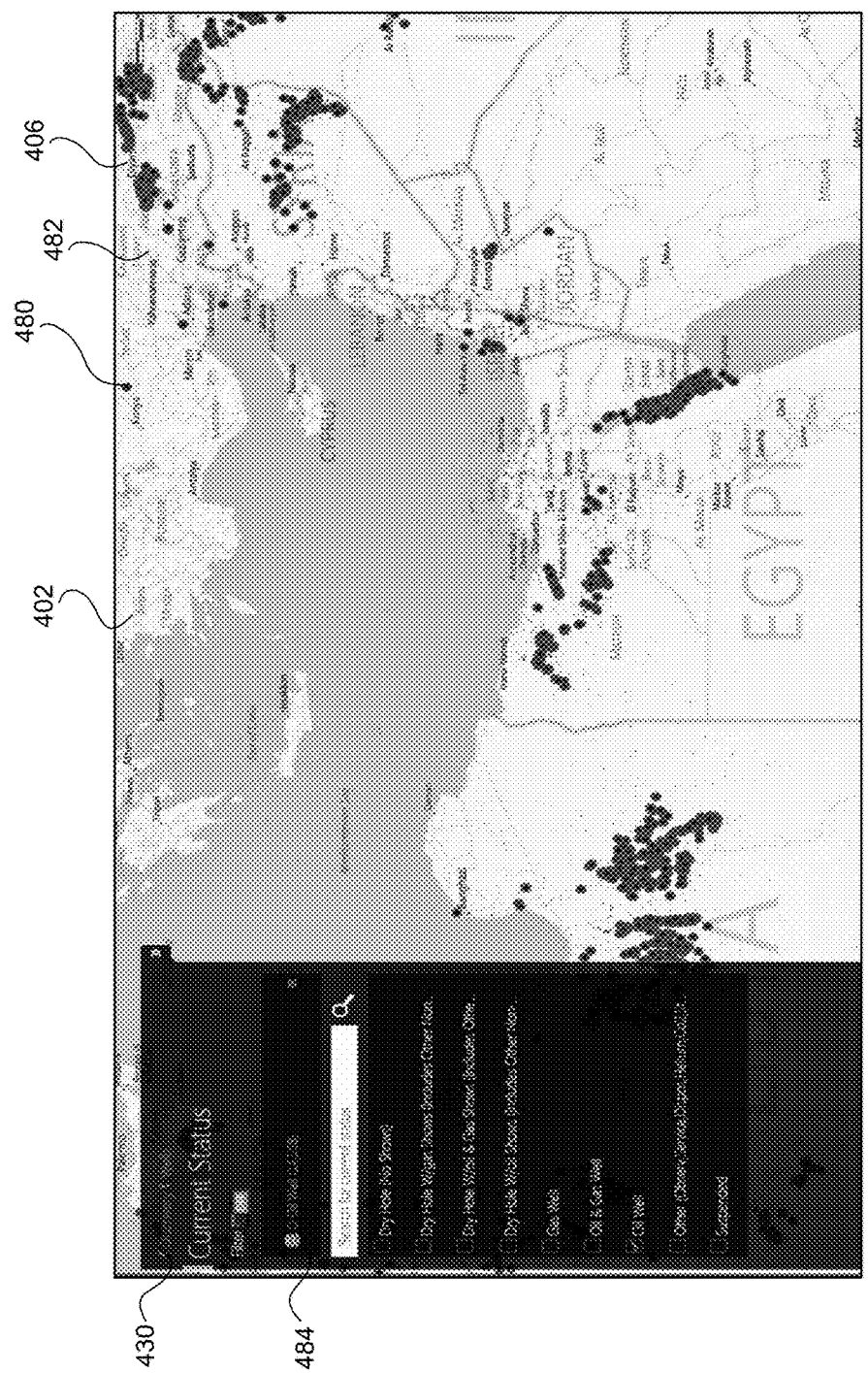
FIG. 8 illustrates a map generated by a mapping module in which the mapping module assigns indicia to a selected attribute value, according to embodiments of the present invention.

FIG. 8 illustrates an exemplary result of the process of FIG. 7. In that figure, the mapping module has identified and retrieved the attribute information for those objects within the map 402. In addition, the user has selected the "Oil Well" attribute value using the panel 430. The mapping module uses that criteria to execute its query and identify those objects exhibiting that attribute (i.e., the "oil wells"). As shown in FIG. 8, those oil wells are assigned a particular indicia (a thicker, colored circle 480) within the preview layer 406 that distinguishes those objects from the other, non-oil well objects, which are depicted with a smaller circle 482. In other embodiments, the non-selected attributes may be represented by other distinguishing indicia, such as different colors, sizes, shapes, etc. The attributes, values, and their assigned indicia are tracked and displayed on the panel 430 using, for example, an attribute notification box 484.

Figure 9:
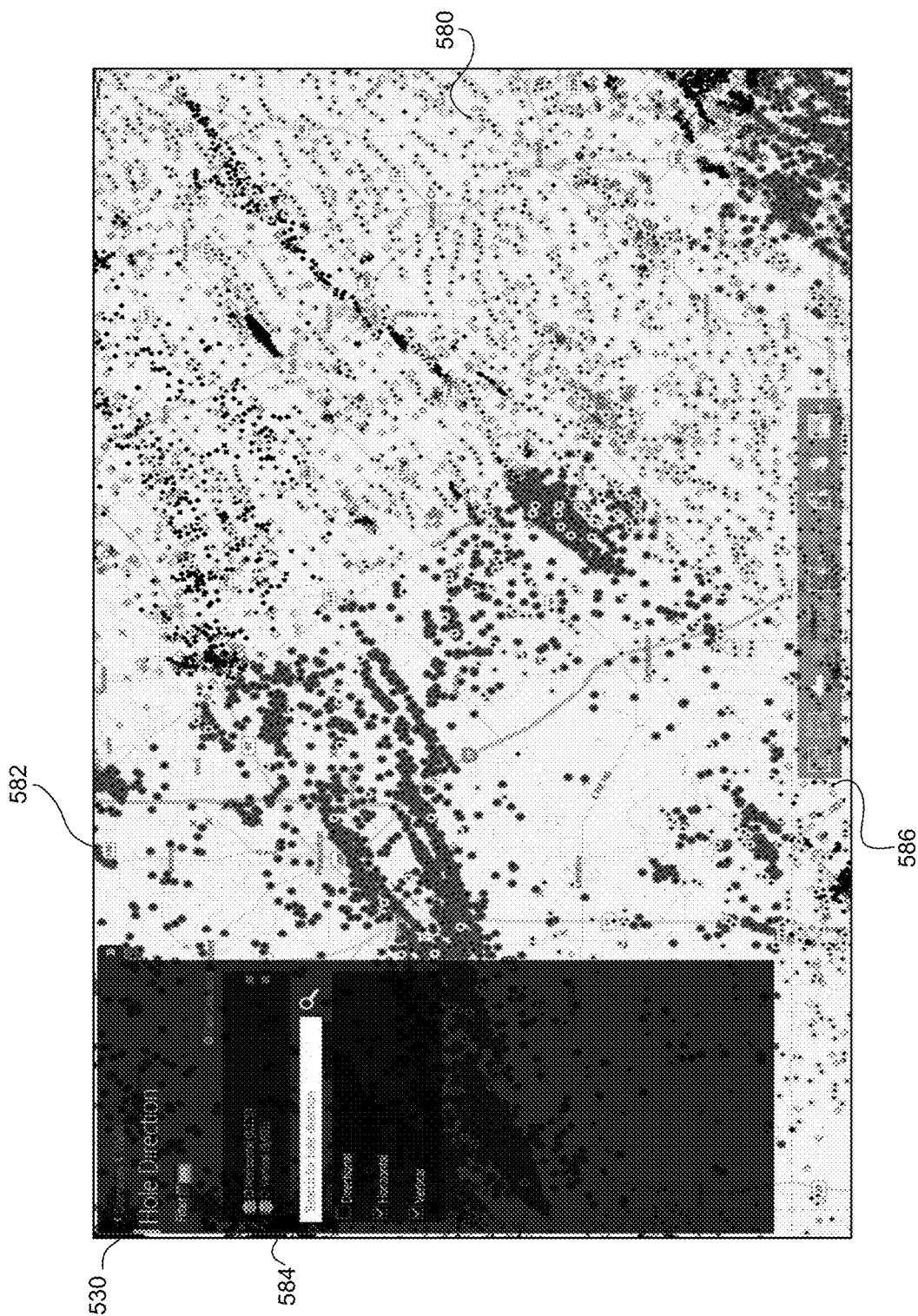
FIG. 9 illustrates a map generated by a mapping module in which the mapping module assigns indicia to selected values of an attribute, according to embodiments of the present invention.

In some embodiments, multiple values for a single attribute can be selected and displayed using a variety of distinguishing indicia. For example, as shown in FIG. 9, the user has selected two different values for the "Hole Direction" attribute: "horizontal" wells and "vertical" wells. In this embodiment, the mapping module treats those criteria with the Boolean <OR> when executing the query (block 308 in FIG. 7). When the mapping module assigns the indicia (block 310 in FIG. 7), each value for the attribute will be assigned a distinct indicia. For example, in FIG. 9, distinct colors and outlines are used to distinguish vertical wells, horizontal wells, and other wells. Specifically, the horizontal wells are assigned indicia 580, vertical wells are assigned indicia 582, and other wells are assigned indicia 586. The attributes, values, and their assigned indicia are tracked and displayed on the panel 530 using, for example, an attribute notification box 584.

Figure 10:
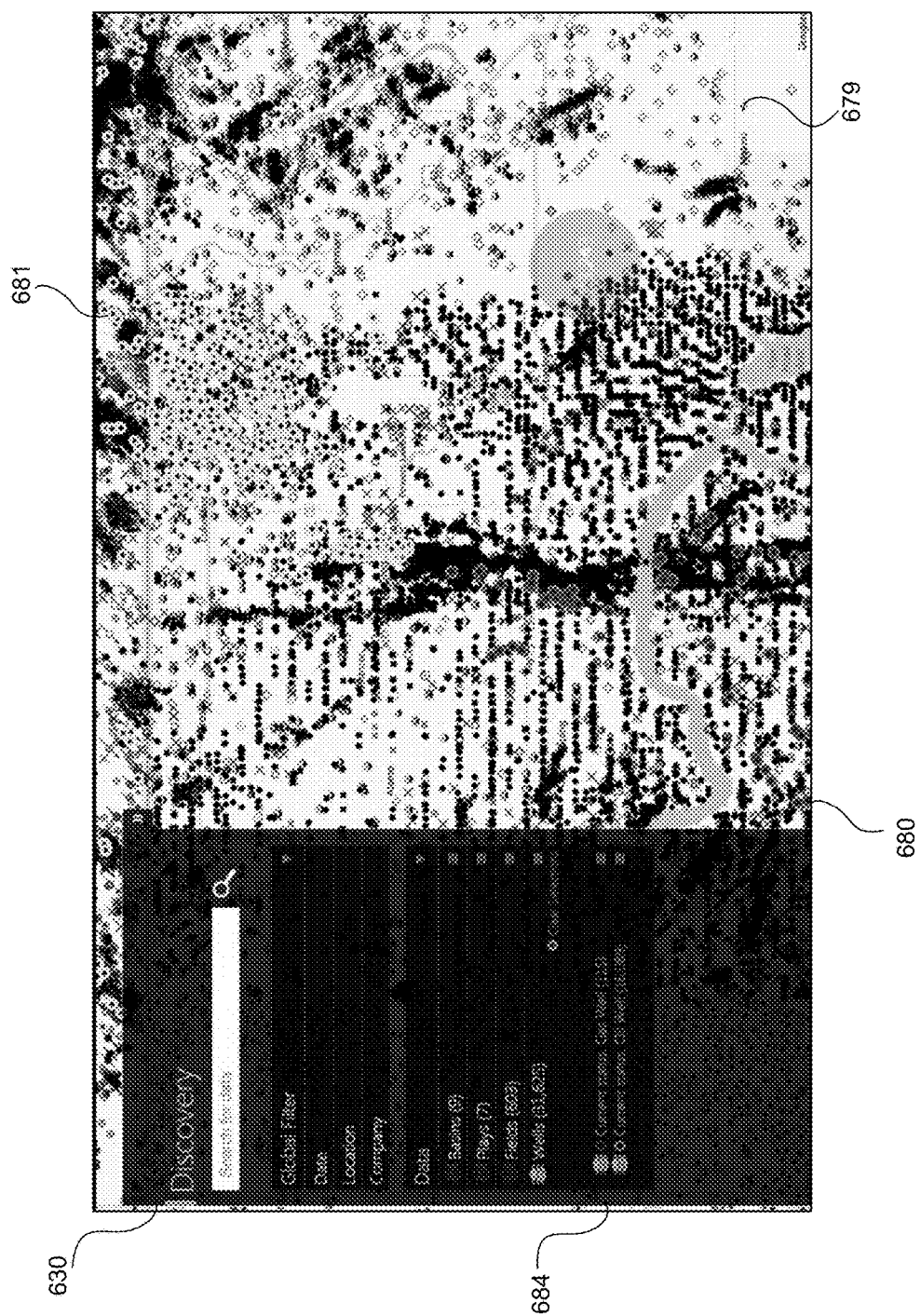
FIG. 10 illustrates a map generated by a mapping module in which the mapping module assigns indicia to selected values of an attribute, according to embodiments of the present invention.

In some embodiments, different attributes and different values for those attributes can be selected and displayed within the preview layer using a variety of indicia. For example, as shown in FIG. 10, the objects (i.e., basins, plays, field, wells) are assigned a default indicia (e.g., indicia 679 for wells). In some embodiments, only a single object type (e.g., wells) are assigned default indicia, while in other embodiments multiple object types are each assigned a different default indicia. In FIG. 10, the user has selected two different attribute values ("Oil Well" and "Gas Well") for an attribute ("Current Status") for the same type of object ("Wells"). In this embodiment, the mapping module treats those criteria with the Boolean <AND> when executing the search (block 308 in FIG. 7). When the mapping module assigns the indicia (block 310 in FIG. 7), objects meeting that criteria will be assigned a distinct indicia. For example, as shown in FIG. 10, the Oil Wells are assigned indicia 680 while Gas Wells are assigned a different indicia 681. The indicia may vary in size, shape, color, etc., in order to visually distinguish objects exhibiting different attributes and/or attribute values. The attributes, values, and their assigned indicia are tracked and displayed on the panel 630 using, for example, an attribute notification box 684.

Figure 11:
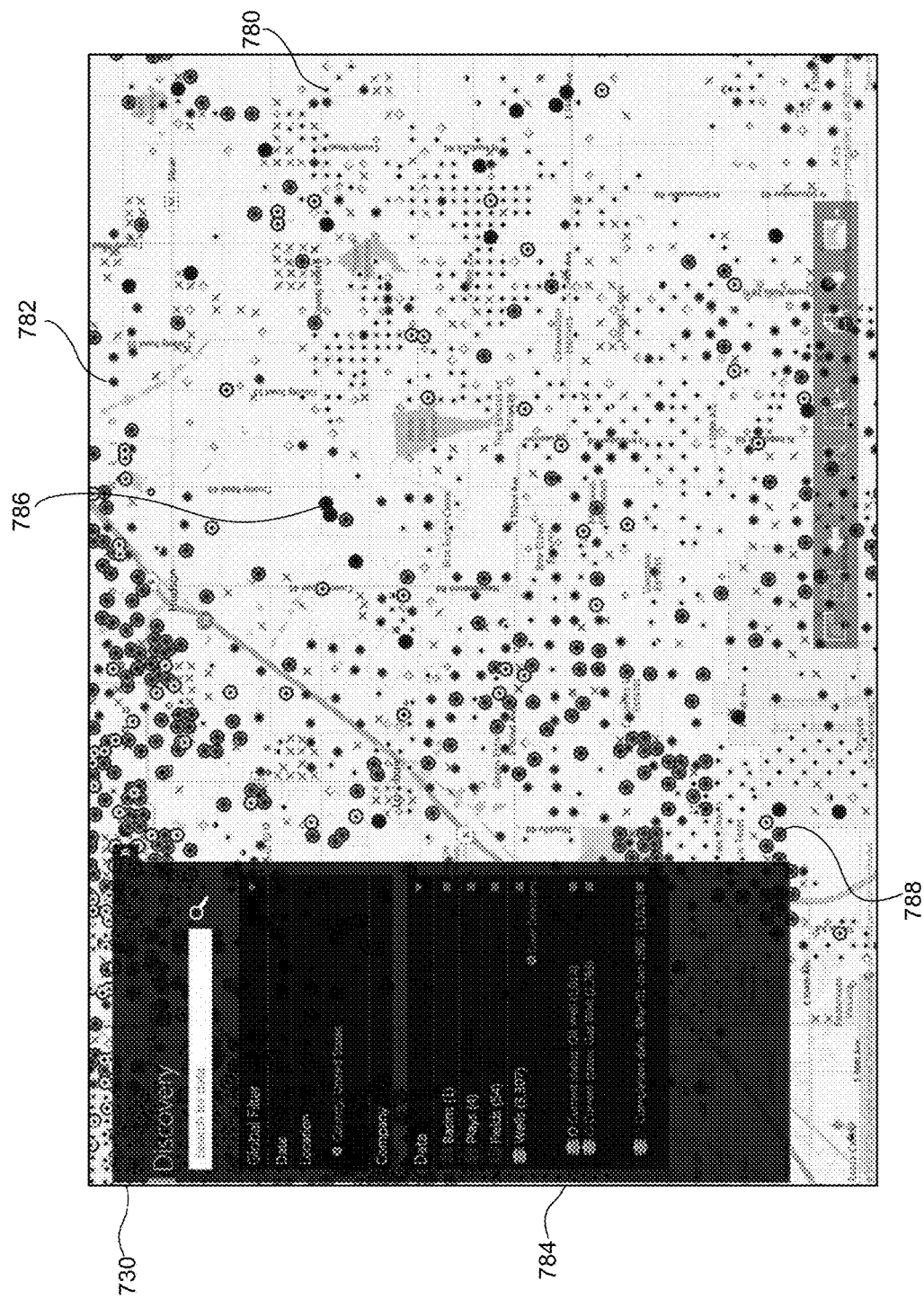
FIG. 11 illustrates a map generated by a mapping module in which the mapping module assigns indicia to selected attributes and values for those attributes, where there is overlap between the attributes, according to embodiments of the present invention.

In some embodiments, there is some overlap between the selected attributes and attribute values. For example, as shown in FIG. 11, the user has selected two different attribute values ("Oil Well" and "Gas Well") for the same attribute ("Current Status") for the same type of object ("Wells"). The user has also selected a different attribute and value ("Completion date: After 1-Jan.-1995"). When multiple selected attributes and/or values are present for a single object (e.g., an "Oil well" that was completed in 2001), the mapping module assigns the same indicia for each object exhibiting a particular attribute value, but will enlarge one of the indicia for objects to which multiple indicia are assigned. For example, in FIG. 11, "Oil Wells" are assigned indicia 780, "Gas Wells" are assigned indicia 782, and objects completed after 1-Jan.-1995 are assigned indicia 786. An example of the enlarged indicia for the time-dependent indicia is shown at 788. Thus, the mapping module can assign multiple attribute indicia to a single object. The attributes, values, and their assigned indicia are tracked and displayed on the panel 730 using, for example, an attribute notification box 784.

Figure 12:
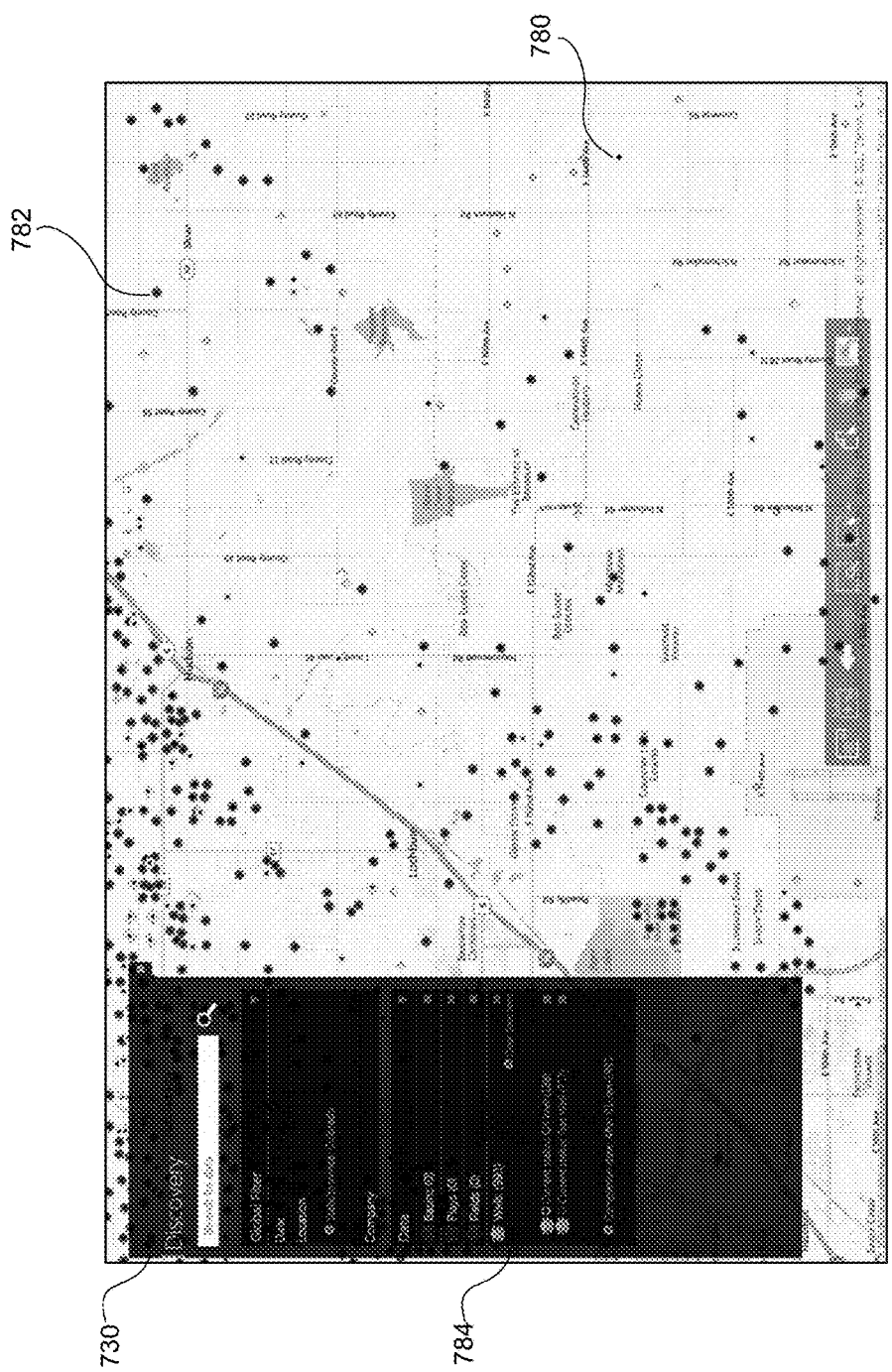
FIG. 12 illustrates the map of FIG. 11 in which a filter has been applied to the preview layer.

In some embodiments, the mapping module uses filtering operations in combination with the preview layers. For example, after the mapping module has generated the preview layer, the mapping module may then use filtering functions to remove some of the information previously displayed in the preview layer. As previously discussed, FIG. 4 includes a filter button (172) that directs the mapping module to use the selected criteria (e.g., an attribute or attribute value) in order to create a filtered layer instead of a preview layer. In those embodiments in which the mapping module applies a filter to the preview layer, the resulting set of objects displayed on the map is reduced because the filter removes those objects failing to meet the user-selected criteria. For example, FIG. 12 illustrates the map of FIG. 11 in which the user has filtered out objects completed after Jan. 1, 1995. In those embodiments, the indicia applied to the objects (e.g., indicia 780 and 782) may not change. In other words, the filtering functions of the mapping module in these embodiments operates to remove information from the map (e.g., objects completed before Jan. 1, 1995) without altering the informational indicia previously presented. This enables users to more readily focus on certain attributes, objects, and their respective relationships with each other. In these embodiments, the user cannot select the same attribute or attribute value for both the preview layer and the filter.

In some embodiments, the mapping module applies a filter using multiple, distinct attributes selected by the user. In those situations, the mapping module sets up the filtering operation using the Boolean <AND>. If a user selects multiple values for a single attribute for filtering, the mapping module sets up the filtering operation using the Boolean <OR>.

Figure 13:
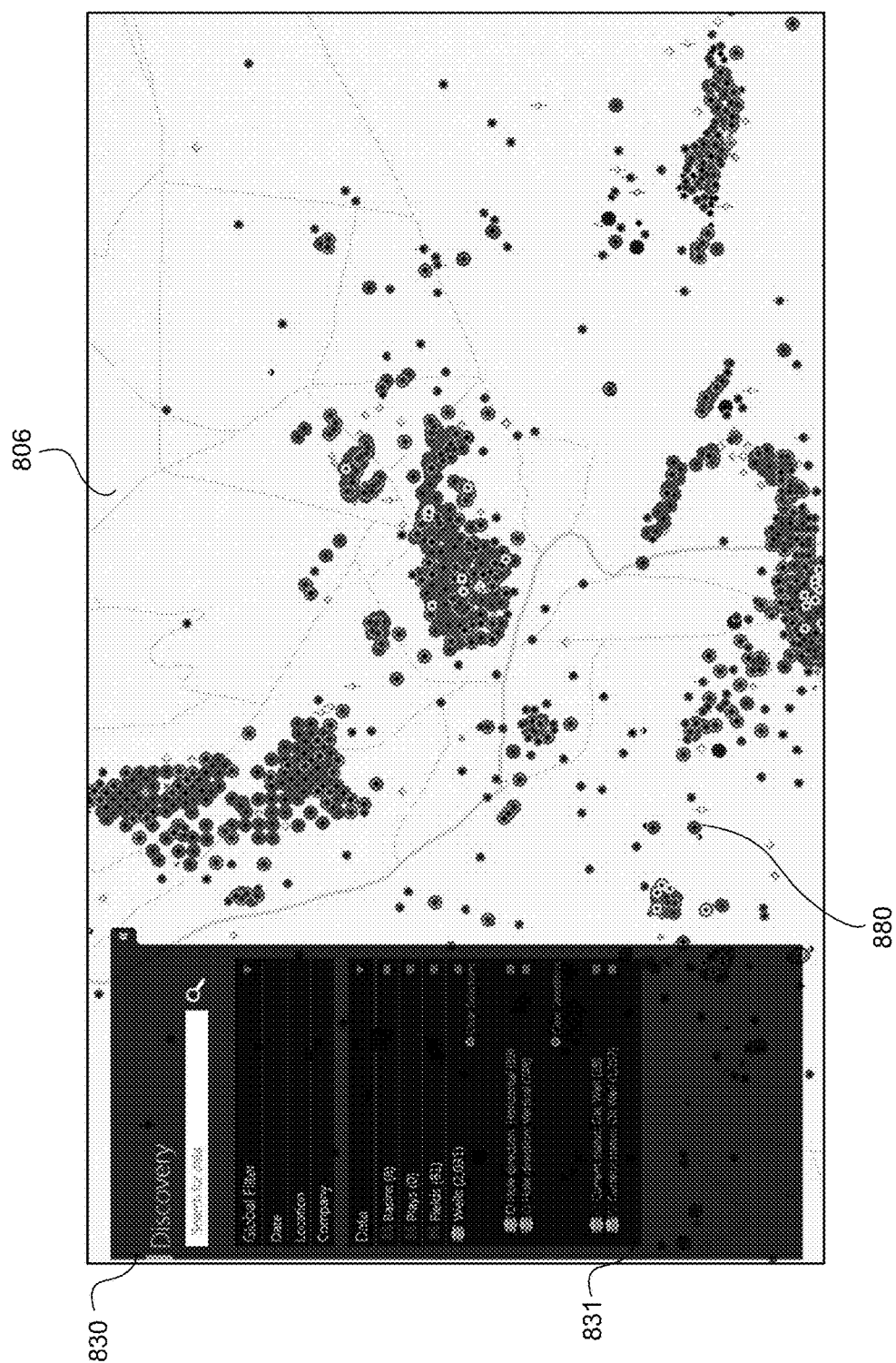
FIG. 13 illustrates a map generated by a mapping module in which the mapping module assigns indicia to selected attributes and values for those attributes.
Figure 14:
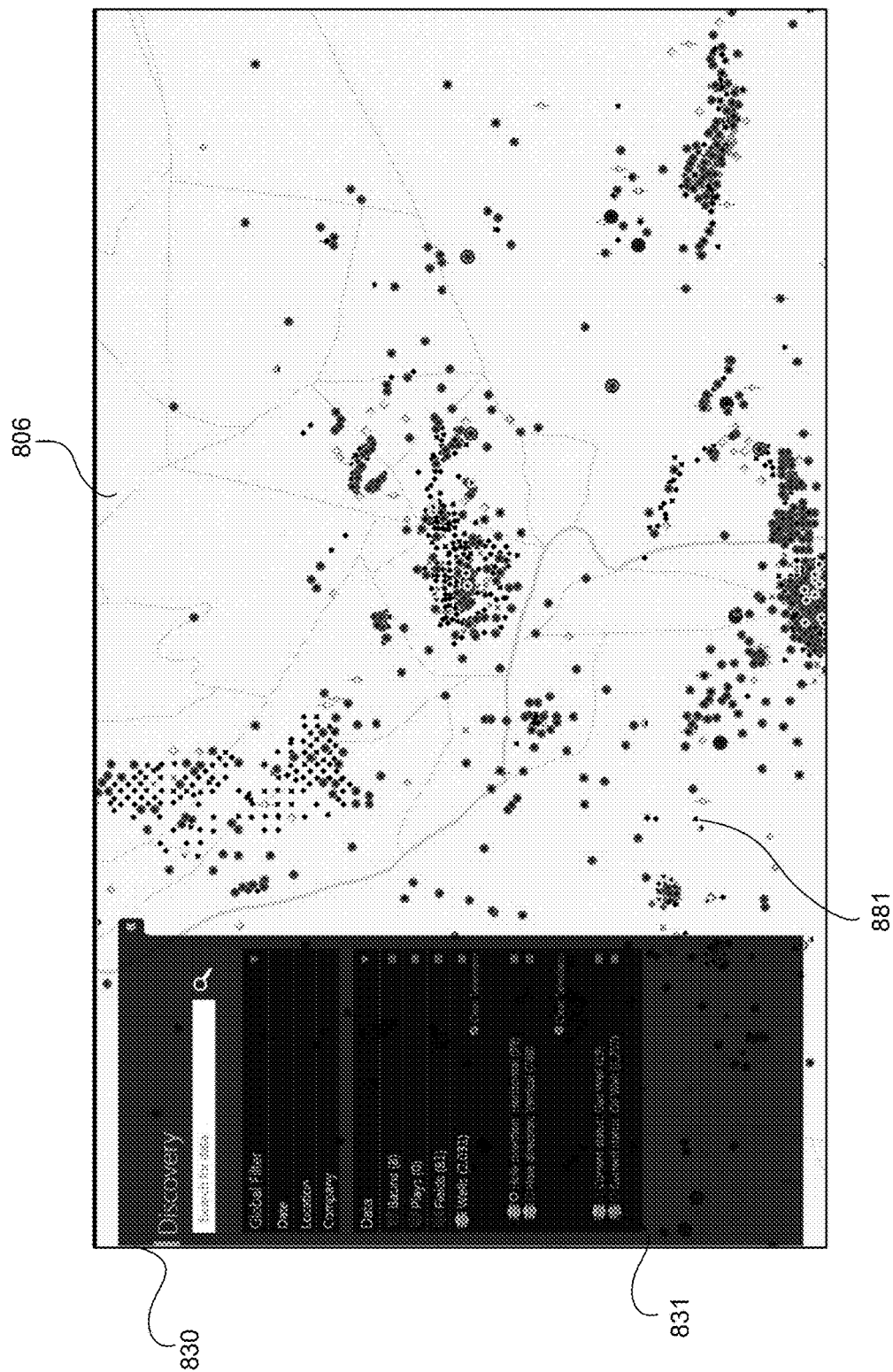
FIG. 14 illustrates the map of FIG. 13 in which indicia for an attribute has been toggled off of the preview layer.

As discussed above, the mapping module retains and leverages the preview criteria previously received from the user (e.g., via the panel 130). Thus, any user-initiated map movements (e.g., zoom, pan) will cause the mapping module to re-run the query (block 308 in FIG. 7). In some embodiments, the user instructs the mapping module to toggle on and off a preview layer or attributes within a preview layer. For example, as shown in FIG. 13, the preview layer 806 includes the selected attribute value "Oil Well" for the attribute "Current Status." Those objects exhibiting that attribute are assigned indicia 880. The discovery panel 830 includes a toggle button 831 for that attribute value. Selecting that toggle button 831 causes the mapping module to toggle off the indicia for that attribute value, as shown in FIG. 14. Specifically object 881 is no longer highlighted with indicia 880, while the remaining sets of indicia remain intact. In some embodiments, multiple attributes may be toggled together. Similarly, in some embodiments the user may also instruct the mapping module to toggle on and off a filter layer or attributes within a filter layer. This enables the user to quickly compare the presence or absence of the selected criteria with the unaffected objects.

Figure 15:
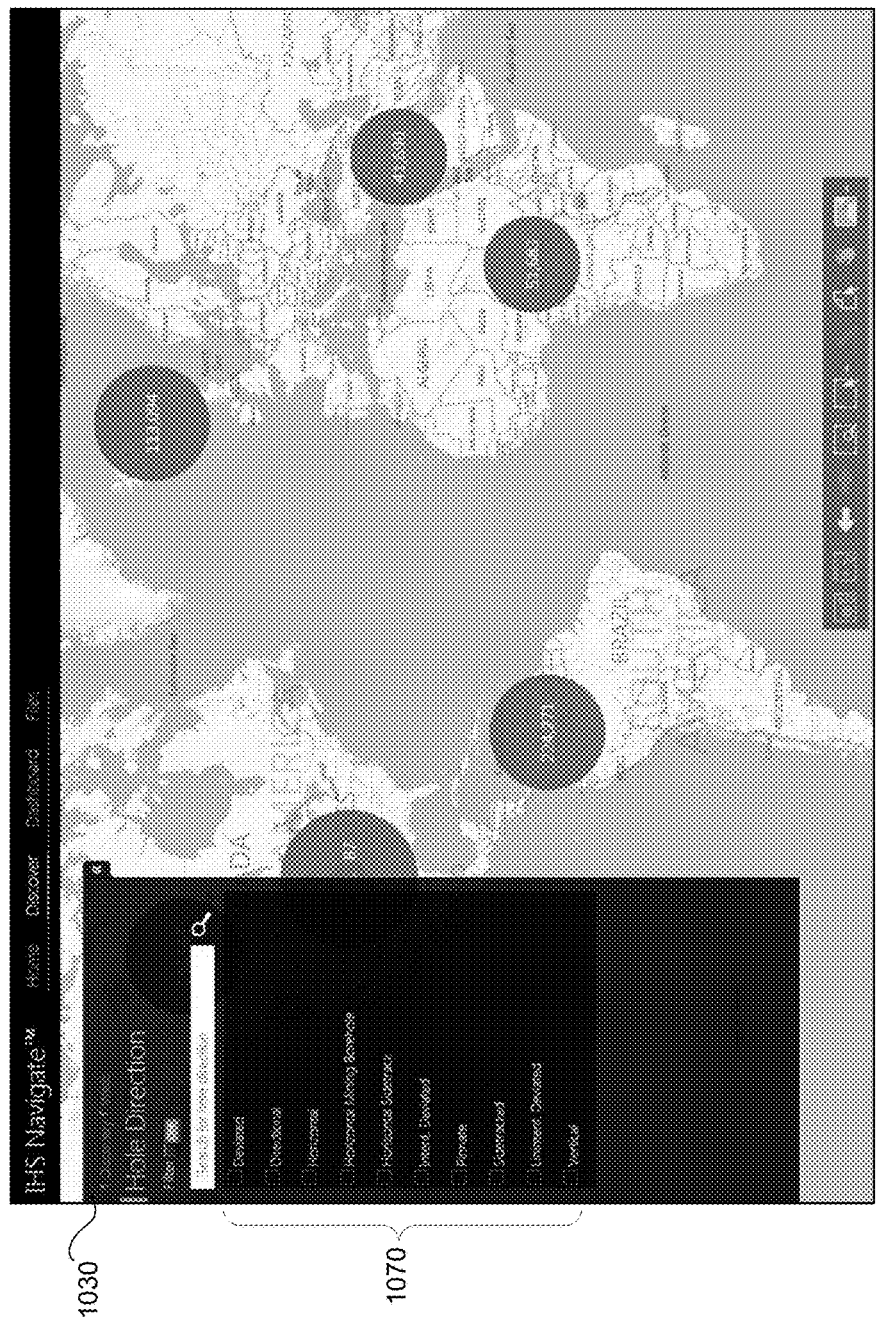
FIG. 15 illustrates a map generated by a mapping module displaying a list of available values for a particular attribute.
Figure 16:
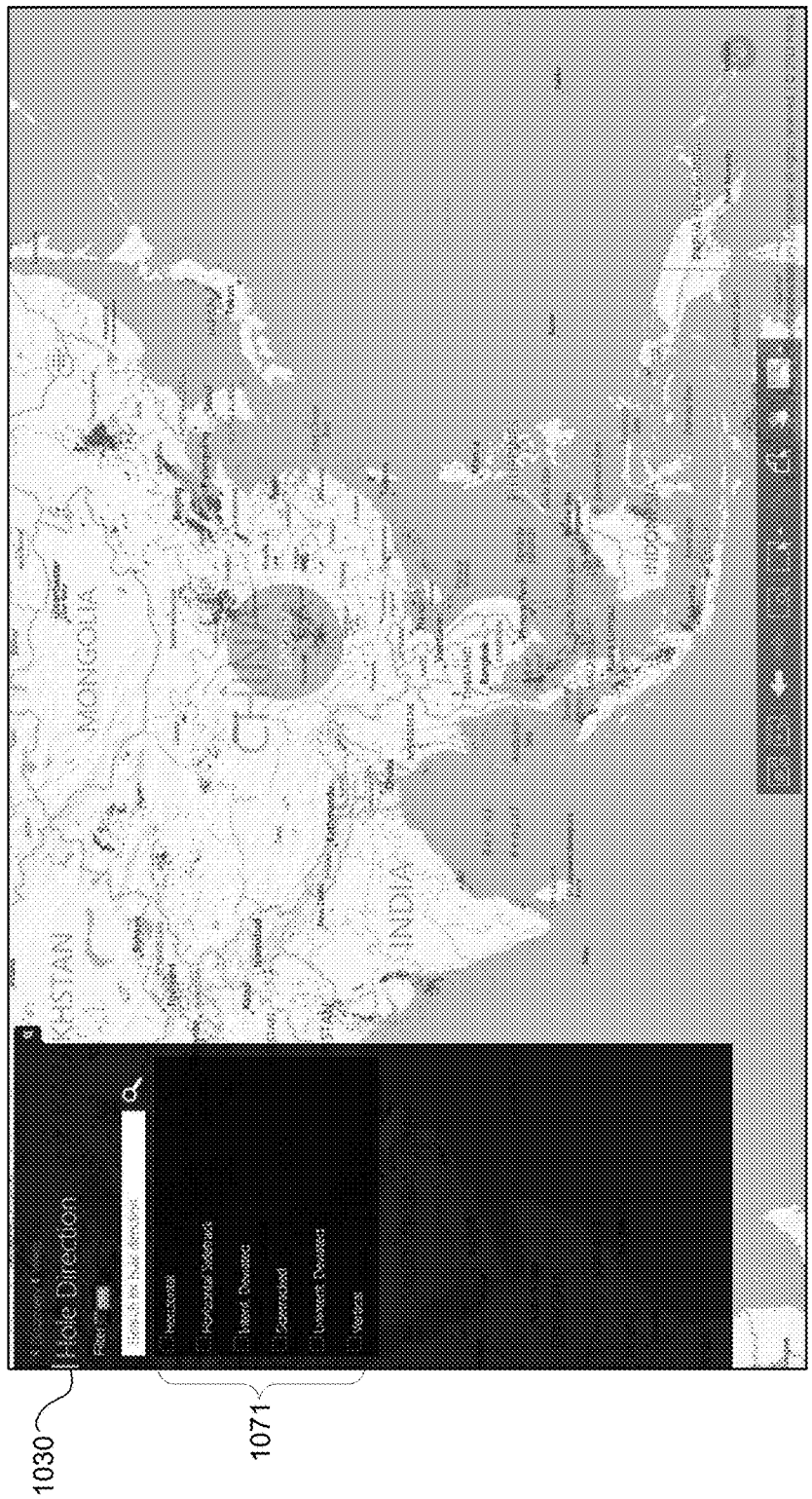
FIG. 16 illustrates the map of FIG. 15 in which the list of available values for the particular attribute has been reduced due to a change in mapping boundaries.

Referring now to FIG. 15, the mapping module generates a discovery panel 1030 in which attributes and attribute values for all of the objects within a map view are listed. For example, the panel 1030 in FIG. 15 identifies all the attribute values 1070 for the attribute "Hole Direction" for all the objects within that map view. If the map boundaries change, for example, in response to a user-initiated command, the mapping module modifies that list 1070 of attribute values. For example, in FIG. 16 the user has zoomed- in to a specific region of south-east Asia. In response to the map boundary change, the mapping module automatically searches and identifies the attributes and attribute values for those objects within the new map boundaries. Because the changed map boundaries excludes objects exhibiting particular attribute features, the list 1071 of attribute values shown in FIG. 16 is smaller than the list 1070 shown in FIG. 15. In other words, the list 1071 of attribute values shown in FIG. 16 includes attributes for only those objects within the current map view. These operations may be performed in real-time and the executing the zoom-in command may be performed simultaneously (or near-simultaneously) with the searching and updating the discovery panel 1030.

Figure 17:
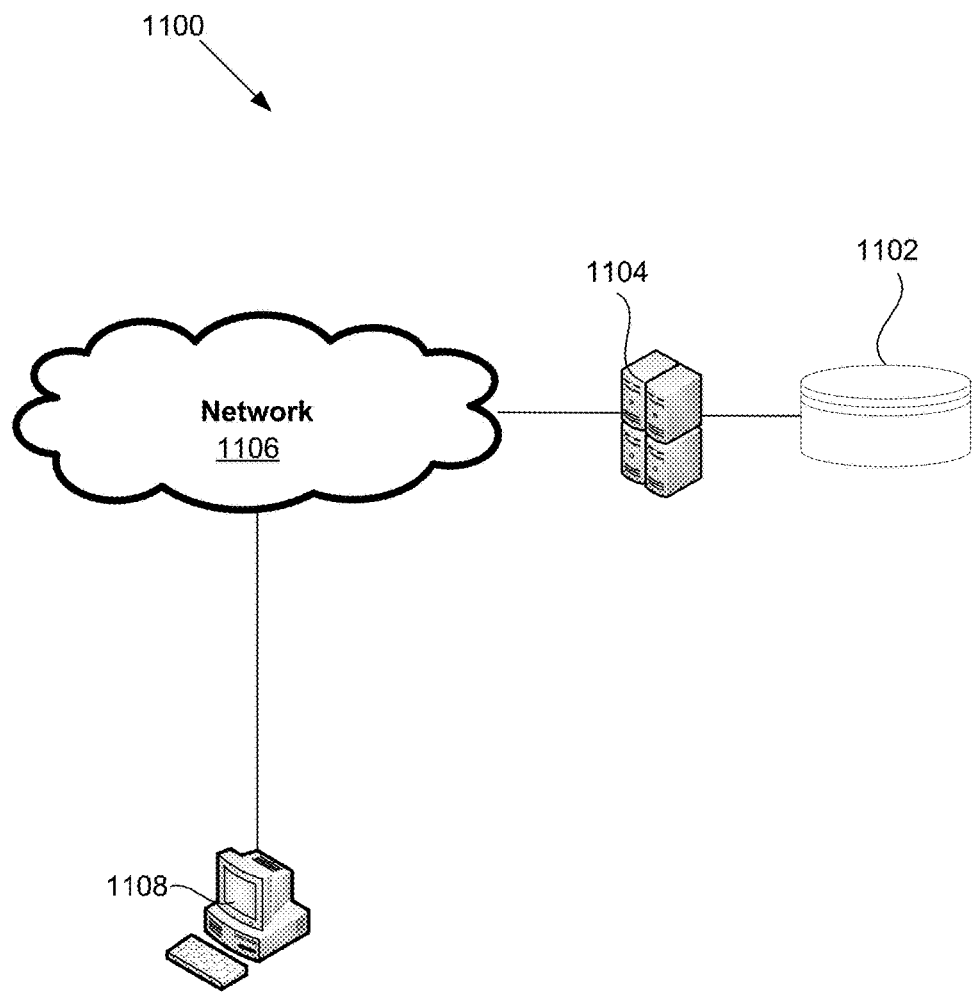
FIG. 17 illustrates an exemplary computer-based system that may be used, in whole or in part, in embodiments of the present invention.

Referring now to FIG. 17, several embodiments of the present invention (as well as environments in which they operate) utilize multiple computer-based components that may be connected over a network, such as the Internet or a local intranet. Specifically, a networked environment 1100 may include a database 1102 and/or a database server 1104. The database may include a processor as well as non-transitory, tangible storage media, such as a hard disc drive, in which information is stored. The database server 1104, as well as the other computer-based components discussed below, likewise may employ one or more processors as well as non-transitory, tangible storage media, such as a hard disc drive, in which information is stored. The database 1102 and the database server 1104 are connected to a network 1106, such as the Internet. Also connected to the network 1106 is a user computer 1108. The user computer may be a desktop, laptop, tablet, smartphone, or any other computing device.

Figure 18A:
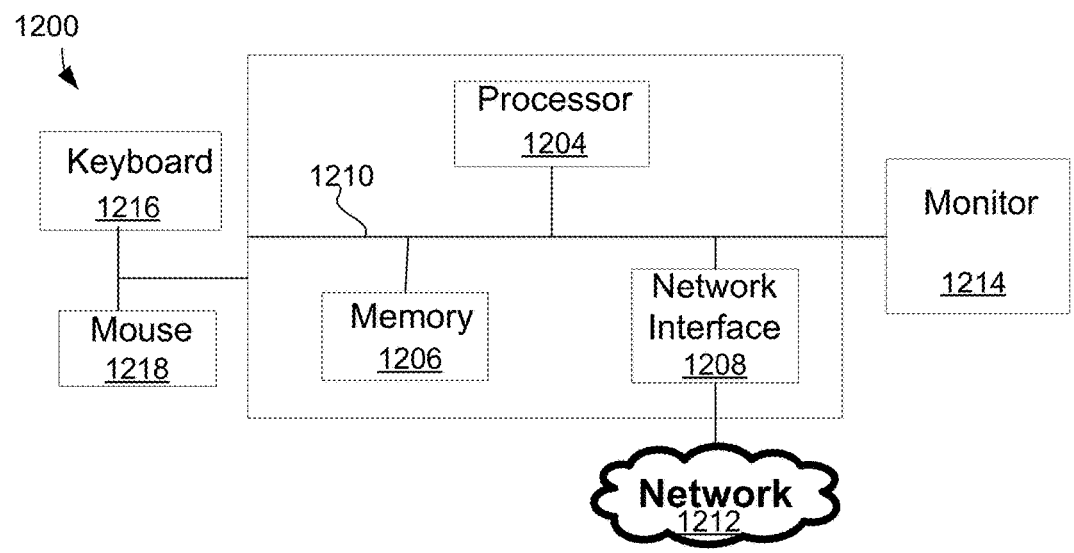
FIG. 18A illustrates an exemplary computer that may be used, in whole or in part, in embodiments of the present invention.
Figure 18B:
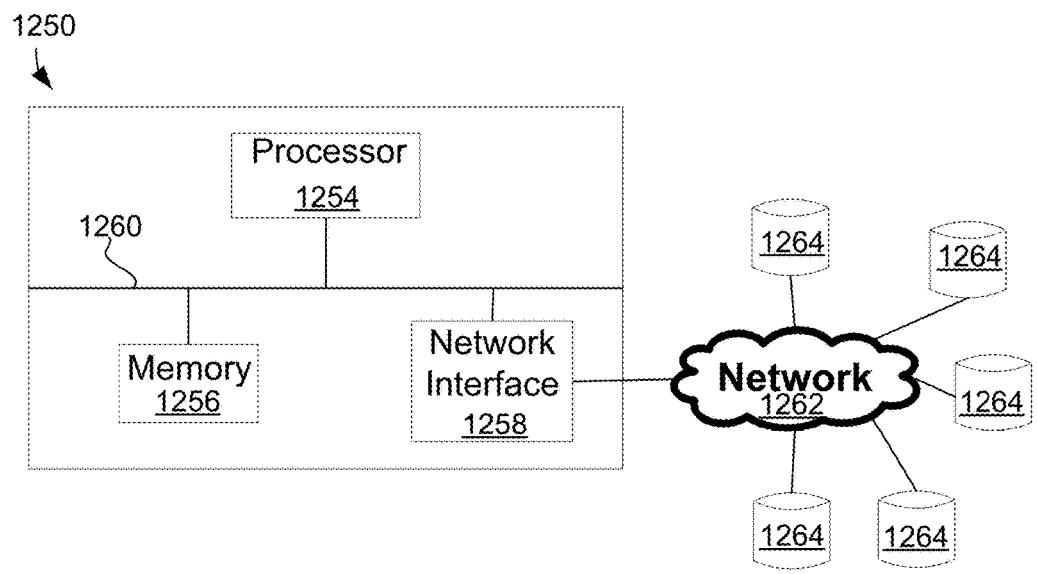
FIG. 18B illustrates an exemplary computer server that may be used, in whole or in part, in embodiments of the present invention.

FIG. 18A illustrates a computer system 1200, and aspects thereof, that may serve as the user computer 1108. The illustrated computer system 1200 includes a processor 1204 coupled to a memory 1206 and a network interface 1208 through a bus 1210. The network interface 1208 is also coupled to a network 1212 such as the Internet. The computer system 1200 may further include a monitor 1214, a keyboard 1216, and a mouse 1218. In other embodiments, the computer system 1200 may use other mechanisms for data input/output and may include a plurality of components (e.g., a plurality of memories 1206 or buses 1210). FIG. 18B illustrates a computer server 1250 and aspects thereof, which may serve as the database server 1104. The illustrated computer server 1250 includes a processor 1254 coupled to a memory 1256 and a network interface 1258 through a bus 1260. The network interface 1258 is also coupled to a network 1262 such as the Internet. In other embodiments, the computer server 1250 may include a plurality of components (e.g., a plurality of memories 1256 or buses 1260). The network 1262 may include a remote data storage system including a plurality of remote storage units 1264 configured to store data at remote locations. Each remote storage unit 1264 may be network addressable storage. In some embodiments, the computer system 1200 and/or the computer server 1250 include a tangible, non-transitory computer-readable medium containing instructions that cause the processor 1254 to perform specific functions described above. That medium may include a hard drive, a disk, memory, or a transmission, among other computer-readable media.

Referring back to FIG. 17, in some embodiments the database 1102 stores information relating to a number of objects. Specifically, for each object the database stores information regarding multiple attributes of that object. This stored data is referred to as a multi-dimensional array. The database 1102 may analyze and tag each entry within the multi-dimensional array in order to identify various attributes. One attribute within each multi-dimensional array is a geo-positional location. In some embodiments, a mapping module operates on the user computer 1108, e.g., using the processor 1204 in conjunction with the memory 1206 and other components of the user computer 1108.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A computer implemented method for depicting relationships between a plurality of real-world objects having a plurality of attributes using a preview layer created using attribute information that identifies a plurality of attributes for each of the plurality of real-world objects, the preview layer including a first indicia that identifies a first attribute of the plurality of attributes as well as real-world objects that exhibit the first attribute and a second indicia that identifies a second attribute of the plurality of attributes as well as real-world objects that exhibit the second attribute, the preview layer being created without first filtering the attribute information, the method comprising:
- receiving search criteria that identifies an attribute of the plurality of attributes;
- forming a search query that includes the attribute from the search criteria;
- modifying the preview layer to include additional indicia that identifies the attribute from the search criteria as well as real-world objects exhibiting that attribute;
- overlaying the modified preview layer on top of a corresponding base map; and
- displaying the modified map image on a display device.

2. The computer implemented method of claim 1, wherein, when a real-world object exhibits the first attribute and the second attribute, a feature of the second indicia is altered so that the first indicia and the second indicia can each identify that real-world object at the same time.

3. The computer implemented method of claim 1, wherein the altered feature of the second indicia is indicia size.

4. The computer implemented method of claim 1, further comprising:
- determining a set of real-world objects that exhibit the attribute from the search criteria, using the search query;
- determining boundaries of the base map that include the set of real-world objects; and
- automatically modifying the base map to match the determined boundaries.

5. The computer implemented method of claim 1, further comprising:
- determining a set of real-world objects that pertain to a displayed map image;
- determining a set of attributes exhibited by the set of real-world objects;
- displaying the set of attributes; and
- enabling the user to select an attribute from among those displayed for use in the search query.

6. The computer implemented method of claim 1, further comprising:
- receiving search criteria from a user that identifies a first value and a second value of an attribute;
- forming a search query that includes the first value and the second value of the attribute;
- modifying the preview layer to include indicia that identifies real-world objects that exhibit either the first value or the second value of the attribute;
- modifying the map image by overlaying the modified preview layer on top of the corresponding base map; and
- displaying the modified map image on the display device.

7. The computer implemented method of claim 1, further comprising:
- receiving a set of instructions from a user to modify the base map;
- automatically forming a search query to identify a set of real-world objects within the modified base map;
- modifying the preview layer to include a plurality of indicia identifying a plurality of attributes for the set of real-world objects without first applying a filter;
- overlaying the modified preview layer on top of the modified base map; and
- displaying the modified map image on the display device.

8. A system for displaying relational information for a plurality of real-world objects, the system comprising:
- an attribute database configured to store multi-dimensional arrays of attribute information for a plurality of real-world objects in tangible, non-transitory storage media;
- a display device; and
- a mapping module operatively coupled to the attribute database and to the display device, wherein the mapping module is configured to:
  - generate a preview layer that identifies a set of real-world objects and a plurality of attributes exhibited by the set of real-world objects using the multi-dimensional arrays of attribute information from the attribute database, wherein the plurality of attributes includes at least two distinct attributes for each of the objects in the set of real-world objects, wherein the at least two distinct attributes are identified by at least two distinct indicia in the preview layer, and wherein the mapping module is configured to generate the preview layer without applying a filter to the multi-dimensional arrays of attribute information from the attribute database;
  - receive a map boundary change via navigational controls;
  - automatically form a search query to identify a set of real-world objects that are within the changed map boundaries;
  - modify the preview layer to include indicia identifying the set of real-world objects and attributes exhibited by the set of real-world objects; and
  - display, on the display device, the modified preview layer overlaid on a corresponding map image.

9. The system of claim 8, wherein the mapping module is further configured to:
- display a discovery panel on the display device;
- receive search criteria from a user via the discovery panel, the search criteria including an attribute or an attribute value; and
- update the preview layer to include indicia identifying a set of real-world objects that exhibit the attribute or attribute value included in the search criteria without applying a filter to the multi-dimensional arrays of attribute information from the attribute database.

10. The system of claim 8, wherein the mapping module is configured to display a discovery panel on the display device that includes the indicia identifying the attributes exhibited by the set of real-world objects.

11. The system of claim 8, wherein the mapping module is configured to display navigational controls on the display device.

12. The system of claim 8, wherein the mapping module is configured to:
- display a discovery panel on the display device;
- receive search criteria from a user via the discovery panel, the search criteria including an attribute or a value of an attribute; and
- update the preview layer by filtering out real-world objects that exhibit the attribute or the value of the attribute included in the search criteria without excluding from the preview layer real-world objects that do not exhibit the attribute or the value of the attribute included in the search criteria.

13. A tangible, non-transitory recording medium storing instructions that, when executed by one or more processors, cause the one or more processors to perform the following:

generate and display, on a display device, a discovery panel that includes a plurality of selectable icons, each of the plurality of selectable icons representing an attribute or a value of an attribute of a plurality of objects, identify an attribute or attribute value selected by a user using the selectable icons on the discovery panel;

identify a plurality of objects that exhibit the selected attribute or attribute value;

identify a map boundary change to a base map so that the plurality of objects that exhibit the selected attribute or attribute value are displayed; and modify the base map according to the map boundary change.

14. The tangible, non-transitory medium of claim 13, wherein the instructions cause the one or more processors to update the discovery panel and the plurality of selectable icons to identify the objects, attributes, and values of the plurality of objects within the changed map boundaries.

15. The tangible, non-transitory medium of claim 13, wherein the instructions cause the one or more processors to perform the following:

identify a first attribute selected by a user using a corresponding selectable icon on the discovery panel;

identify a second attribute selected by the user using a corresponding selectable icon on the discovery panel;

generate a first visual indicator on a preview layer identifying objects of the plurality of objects that exhibit the first attribute;

generate a second visual indicator on the preview layer identifying objects of the plurality of objects that exhibit the second attribute, wherein the first visual indicator is distinct from the second visual indicator and wherein generating the first visual indicator and the second visual indicator on the preview layer is performed without filtering the objects or the attributes of the plurality of objects.

16. The tangible, non-transitory medium of claim 15, wherein, when at least one of the objects exhibiting the first attribute also exhibits the second attribute, the instructions cause the one or more processors to change a feature of the second visual indicator that identifies the at least one of the objects exhibiting the first attribute and the second attribute.

17. The tangible, non-transitory medium of claim 13, wherein the instructions further cause the one or more processors to perform the following:

identify a map boundary change initiated by a user;

identify a plurality of objects within the changed map boundaries;

identify attributes of the plurality of objects within the changed map boundaries;

identify values of the attributes of the plurality of objects within the changed map boundaries; and update the discovery panel and the plurality of selectable icons to identify the objects, attributes, and values of the plurality of object within the changed map boundaries.

18. The tangible, non-transitory medium of claim 17, wherein the instructions cause the one or more processors to change the base map to reflect the changed map boundaries and to update the discovery panel and the plurality of selectable icons without additional user input and without filtering the objects, the attributes, or the values of the plurality of objects.

19. The tangible, non-transitory medium of claim 13, wherein the instructions cause the one or more processors to modify the base map to reflect the changed map boundaries and to update the discovery panel and the plurality of selectable icons without additional user input and without filtering the objects, the attributes, or the values of the plurality of objects.

* * * * *